Patented Oct. 10, 1922.  1,431,448

UNITED STATES PATENT OFFICE.

ALFRED HUGH GALLAGHER, OF OAK PARK, ILLINOIS, ASSIGNOR TO NATIONAL RETARDER COMPANY, OF CHICAGO, ILLINOIS, A CORPORATION OF OHIO.

PRODUCTION OF YEAST FOOD.

No Drawing.    Application filed May 15, 1920.   Serial No. 381,554.

*To all whom it may concern:*

Be it known that I, ALFRED HUGH GALLAGHER, a citizen of the United States, residing at Oak Park, in the county of Cook, State of Illinois, have invented certain new and useful Improvements in the Production of Yeast Food; and I do hereby declare the following to be a full, clear, and exact description of the invention, such as will enable others skilled in the art to which it appertains to make and use the same.

This invention relates to improvements in the production of yeast food for use in the growing of bakers' yeast of good color, odor and keeping qualities and having good baking strength when used in the manufacture of leavened bread.

In growing or propagation of bakers' yeast a considerable amount of nitrogenous food material is essential. It is, moreover, important to insure that the nitrogenous food material supplied is of suitable character and quality so as to avoid imparting to the yeast, and to the bread made therewith, an objectionable odor or flavor, or a dark color, and avoid weakening the baking strength of the yeast. Inasmuch as yeast is itself a vegetable growth, it has been the common and almost universal practice in the art to employ malt sprouts as the nitrogenous food material in the growing of bakers' yeast, the yeast being thereby supplied with nitrogenous food material of vegetable origin.

According to the present invention, a yeast food having valuable properties adapting it for use to advantage in the growing of bakers' yeast of good color, odor and keeping qualities, and having good baking strength when used in the manufacture of leavened bread, is produced from chrome tanned leather by a suitable combined treatment thereof which results in the elimination of the chromium compounds in an insoluble form and the conversion of the protein of the hide into soluble form, hydrolyzed to the proper degree.

I have found that if the chrome tanned leather is subjected to digestion with lime under pressure at a suitable temperature and for a sufficient time, the chromium compounds will be converted into an insoluble form and the protein will, during the same operation, be hydrolyzed to a sufficient degree to make it suitable for use in the growing of bakers' yeast of the character above referred to. The process of the present invention, accordingly, involves a combined operation of hydrolysis and removal of the chromium in an insoluble state, so that a valuable yeast food can be directly produced from the chrome tanned hides without preliminary treatment thereof for the removal of the chromium compounds. The chromium compounds which, if not removed, would be detrimental to the growth of the yeast, are, according to the present invention, removed during the hydrolyzing operation by converting them into an insoluble form.

According to the present invention the chrome tanned leather is subjected to hydrolysis with lime and water at an elevated temperature and for a prolonged period of time. Whereas hydrolysis with acids, or even with caustic soda or soda ash, would result in the production of soluble chromium compounds, the treatment with lime according to the present invention converts the chromium compounds into an insoluble form, e. g., chromium hydroxide, calcium chromate, or other products, which can be removed at the end of the hydrolyzing operation by settling or by filtration. The treatment of the leather with lime has the further advantage of converting the sulfur compounds of the hide into a form unobjectionable when the hydrolyzed product, freed from insoluble matter, is used in the growing of bakers' yeast.

The invention will be further illustrated by the following specific example, the parts being by weight:

400 parts of chrome tanned leather (dry weight), 40 parts of quick lime, and 1000 to 1600 parts of water are heated in a closed autoclave with agitation at a temperature of about 160 to 180° C. for a period of from 3 to 8 hours, e. g., about 5 or 6 hours. During this digestion the chromium compounds are converted into an insoluble form and are precipitated while the protein of the hides is hydrolyzed to the proper degree. On cooling of the digestion product, the chromium compounds, together with some insoluble organic material, can be removed by filtration or they can be settled out, leaving the supernatant liquor containing the hydrolyzed protein in solution. The liquor can be syphoned off or removed by filtration. The chromium is thus readily removed in the form of its insoluble compounds along with the insoluble organic material.

The solution of hydrolyzed protein thus produced contains its nitrogen in the form of simpler compounds, particularly amino acids, and simpler proteoses, which compounds are of the proper degree of hydrolysis for yeast growth. It is important to obtain the proper degree of hydrolysis of the protein in order to make it available for proper use as a yeast nutrient. Mere solution of the protein is not sufficient, and if the products of hydrolysis are too complex they are not readily assimilated by the yeast cells and give difficulties when used. So also, the hydrolysis should not be continued too far, as a too thorough hydrolysis of the protein will not produce the best quality or the highest yields of yeast, that is, the hydrolysis should not be continued to such a degree that all, or the greater portion, of the protein is broken down to amino acids, together with small amounts of ammonia. The hydrolysis should be continued to such a degree that some of the nitrogen is in the form of amino acids and some in the form of the less complex proteoses, for obtaining best results as a yeast nutrient.

It is a further advantage of the invention that the hydrolysis with lime results in the removal of objectionable sulfur compounds from the products of hydrolysis. These sulfur compounds, if not removed, would produce a disagreeable and objectionable odor and flavor in the yeast which would interfere with its proper use in the making of leavened bread. It is a further advantage of the invention that the treatment with lime leaves in the product a desirable amount of lime, in a combined form, this lime also being of value as an ingredient of the yeast nutrient.

The clear solution of hydrolyzed protein, produced as above described, and freed from insoluble matter, is treated to neutralize the greater portion of the free lime, by treatment with dilute sulfuric acid, the neutralization being preferably stopped while the solution is still slightly alkaline. The solution is then concentrated to a suitable degree, preferably to such a degree that it will present a concentrated and more or less thick syrup or paste, which can be readily handled and transported. Instead, however, of concentrating the solution, it can be directly used as a yeast nutrient or it can be used in a partially concentrated state, particularly where it is to be used at the place of its production. Where it is to be transported for any distance, it should be concentrated to a more or less thick state e. g. until it contains 60 to 70% solids, and, in such a state, it can be readily used by dissolving in water in appropriate amount.

In using the yeast nutrient, for the growing of yeast, the nutrient is associated with the carbohydrates or carbohydrate substances, and with the yeast, and the growth of the yeast is then permitted to take place under conditions similar to those commonly employed when malt sprouts are used as the nitrogenous nutrient. The yeast nutrient of the present invention, although of high nitrogen content, and although of animal origin, can nevertheless be used in sufficiently large amounts to insure rapid yeast growth without objectionable formation of by-products or of objectionable color, odor, or taste.

The following specific example will further illustrate the growing of yeast with the improved nutrient. This nutrient can be used either in the form of the dilute solution, first neutralized, or a solution can be made by dissolving the dried nutrient or the concentrated nutrient (in the form of a syrup or paste) in sufficient water to form a solution. 29 parts of hydrolyzed protein (dry basis) are added to a mash made up of about 800 pounds of grains, such as mixed corn, barley and rye and 5 parts of weight of yeast are added to the aqueous extract thereof, and permitted to develop in the usual way. The resulting yeast is of good color, odor and keeping qualities, and is comparable with bakers' yeast obtained when malt sprouts are employed as the source of the nitrogenous material. The yeast has good baking strength and is well adapted for use in the manufacture of leavened bread. It can be used directly for bread making or it can be converted into the form of compressed yeast or into the form of a dry cake.

In the growing of the yeast, it will, of course, be understood that the products of hydrolysis above referred to are not of themselves sufficient for the growing of yeast without the association therewith of added carbohydrates, inasmuch as such hydrolysis products are essentially nitrogenous in character. Accordingly, as above indicated, a carbohydrate or mixture of carbohydrates should be associated with the hydrolytic products, such as, for instance, molasses, and the filtered wort obtained from corn, rye, barley or other grains.

The product of hydrolysis of the animal protein above referred to has the advantage, due to its nitrogenous character, of permitting a saving in the amount of grain commonly required when malt sprouts are used. It presents the further advantage of providing a satisfactory nitrogenous yeast food in a highly concentrated form and free from objectionable ingredients, prejudicial to the yeast growth and to the desired properties of bakers' yeast. It, nevertheless, enables a satisfactory and merchantable yeast to be produced, which is well adapted for use, in the form of compressed yeast, dry yeast, etc., for baking purposes, in the manufacture of leavened bread.

I claim:

1. The method of producing a yeast food adapted for use in the growing of bakers' yeast of good color, odor and keeping qualities and having good baking strength in the manufacture of leavened bread, which comprises subjecting chrome tanned leather to digestion with lime at an elevated temperature and thereby converting the chromium into insoluble compounds and effecting the hydrolysis of the protein of the leather to a degree appropriate for use as a yeast nutrient.

2. The method of producing a yeast food adapted for use in the growing of bakers' yeast of good color, odor and keeping qualities and having good baking strength in the manufacture of leavened bread, which comprises subjecting chrome tanned leather to digestion with lime at an elevated temperature and thereby converting the chromium into insoluble compounds and effecting the hydrolysis of the protein of the leather to a degree appropriate for use as a yeast nutrient, neutralizing the excess lime and separating the resulting solution from the insoluble material.

3. The method of producing a yeast food adapted for use in the growing of bakers' yeast of good color, odor and keeping qualities and having good baking strength in the manufacture of leavened bread, which comprises subjecting chrome tanned leather to hydrolysis with lime and water at a temperature of about 160 to 180° C. and for a period of from 3 to 8 hours, and thereby effecting the conversion of the chromium into insoluble compounds and effecting hydrolysis of the protein of the leather to a degree appropriate for use as a yeast nutrient.

4. The method of producing a yeast food adapted for use in the growing of bakers' yeast of good color, odor and keeping qualities and having good baking strength in the manufacture of leavened bread, which comprises subjecting chrome tanned leather to hydrolysis with lime and water at a temperature of about 160 to 180° C. and for a period of from 3 to 8 hours, and thereby effecting the conversion of the chromium into insoluble compounds and effecting hydrolysis of the protein of the leather to a degree appropriate for use as a yeast nutrient, neutralizing the excess lime and separating the resulting solution from the insoluble material.

5. The method of producing a yeast food adapted for use in the growing of bakers' yeast of good color, odor and keeping qualities and having good baking strength in the manufacture of leavened bread, which comprises subjecting chrome tanned leather to digestion with lime at an elevated temperature and thereby converting the chromium into insoluble compounds and effecting the hydrolysis of the protein of the leather to a degree appropriate for use as a yeast nutrient, neutralizing the excess lime, separating the resulting solution from the insoluble material and concentrating to form a thick product containing about 60 to 70 per cent solids.

6. A yeast nutrient comprising the products of hydrolysis of the protein of chrome tanned leather with lime at an elevated temperature, said nutrient containing amino acids and proteoses and being adapted for use as a yeast nutrient in the growing of bakers' yeast of good color, odor and keeping qualities, and having good baking strength in the manufacture of leavened bread.

In testimony whereof I affix my signature.

ALFRED HUGH GALLAGHER.